(12) United States Patent
Abdallah et al.

(10) Patent No.: US 6,754,812 B1
(45) Date of Patent: *Jun. 22, 2004

(54) HARDWARE PREDICATION FOR CONDITIONAL INSTRUCTION PATH BRANCHING

(75) Inventors: Mohammad A. Abdallah, Folsom, CA (US); Khalid D. Al-Dajani, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 693 days.

This patent is subject to a terminal disclaimer.

(21) Appl. No.: 09/610,895

(22) Filed: Jul. 6, 2000

(51) Int. Cl.[7] .............................................. G06F 9/38
(52) U.S. Cl. ..................................................... 712/234
(58) Field of Search ......................................... 712/234

(56) References Cited

U.S. PATENT DOCUMENTS

| | | | |
|---|---|---|---|
| 5,832,260 A | 11/1998 | Arora et al. | |
| 5,909,573 A | 6/1999 | Sheaffer | |
| 5,999,736 A | 12/1999 | Gupta et al. | |
| 6,021,487 A | 2/2000 | Maliszewski | |
| 6,044,221 A | 3/2000 | Gupta et al. | |
| 6,047,370 A | 4/2000 | Grochowski | |
| 6,076,153 A | 6/2000 | Grochowski et al. | |
| 6,170,052 B1 * | 1/2001 | Morrison | 712/236 |

OTHER PUBLICATIONS

Intel Architecture Optimization Manual, Intel Corporation, Order No. 242816–003, pp. 1–1 to 1–3, 2–1 to 2–16, 3–1 to 3–35, C–1 to C–14, and D–1 to D–2 (1997).

Intel Architecture Optimization Reference Manual, Intel Corporation, Order No. 245127–001, pp. i–xx, 1–1 to 1–16, 2–1 to 2–31, and C–1 to C–19 (1998–1999).

Intel Architecture Software Developer's Manual vol. 1: Basic Architecture, Intel Corporation, Order No. 243190, pp. i–xvi, 1–1 to 1–10, 2–1 to 2–14, and 6–1 to 6–46 (1999).

Intel Architecture Software Developer's Manual vol. 3: System Programming, Intel Corporation, Order No. 243192, pp. i–xxii, 1–1 to 1–9, and 14–1 to 14–35 (1999).

P6 Family of Processors Hardware Developer's Manual, Intel Corporation, Order No. 244004–001, pp. i–vii, 1–1 to 1–2, and 2–1 to 2–7 (Sep. 1998).

Pentium® Processor Developer's Manual, Intel Corporation, Order No. 243502–001, pp. i–x, 1–1 to 104, and 2–1 to 2–14 (Oct. 1997).

U.S. patent application No. 09/611,282, filed Jul. 6, 2000, entitled "Hardware Predication for Conditional Instruction Path Branching", by Mohammad A. Abdallah, et al.

* cited by examiner

*Primary Examiner*—William M. Treat
(74) *Attorney, Agent, or Firm*—Blakely, Sokoloff, Taylor & Zafman LLP

(57) ABSTRACT

An instruction associated with a condition is executed when the condition is resolved. In executing the instruction, a first operation designated by the instruction is performed to produce a first result, and a second operation is performed to produce a second result. The first result or the second result is output based on how the condition is resolved.

21 Claims, 10 Drawing Sheets

HARDWARE PREDICATION FOR CONDITIONAL INSTRUCTION PATH BRANCHING

BACKGROUND OF THE INVENTION

1. Field of the Invention

The present invention relates generally to the field of computer systems. More particularly, the present invention relates to the field of processing instructions having conditional program execution flow control.

2. Description of Related Art

Typical processors execute instructions out of order to help improve instruction throughput. Such processors typically process instructions through a pipeline that fetches instructions from memory, decodes each instruction, executes the instruction, and retires the instruction. The operation of each stage of the pipeline typically overlaps those of the other stages in time to help process instructions faster.

By identifying instructions that may be executed regardless of whether one or more prior fetched instructions are executed, typical processors may benefit from executing instructions in parallel, that is overlapping the execution of two or more instructions in time, and/or from executing instructions out of order to avoid stalling on any one instruction, for example, while waiting for the completed execution of an instruction upon which the stalled instruction depends. Instructions executed out of order are retired by the pipeline in order.

The pipeline generally fetches instructions of a program in a sequential order as defined by the program until the program alters its sequential flow with a jump or branch instruction, for example.

An unconditional branch instruction, for example, identifies a non-sequential target instruction that is to follow the unconditional branch instruction. The pipeline identifies the target instruction and then continues fetching instructions of the program starting with the target instruction. Before identifying the target instruction, however, the pipeline may have already fetched and started processing one or more instructions sequentially following the unconditional branch instruction as defined by the program. The alteration in the sequential flow of the program therefore penalizes the execution of the program as the pipeline is to flush such instruction(s) and restart fetching and processing at the target instruction. By identifying the target instruction early in the pipeline, such as in the fetch or decode stage for example, the pipeline helps avoid or minimize this penalty.

A conditional branch instruction identifies a non-sequential target instruction that is to follow the conditional branch instruction if a condition identified by the conditional branch instruction is satisfied. If the condition is not satisfied, the fall through instruction, that is the instruction sequentially following the conditional branch instruction as defined by the program, is to follow the conditional branch instruction. Because resolution of the condition relies on the execution of one or more other instructions, the condition may not be resolved when the conditional branch instruction is fetched. As the pipeline then cannot determine which instruction is to follow the conditional branch instruction, the pipeline typically predicts whether the target instruction or the fall through instruction will follow at the risk of penalizing the execution of the program if the pipeline later determines the wrong instruction was selected. If, for example, the pipeline selects the target instruction and the condition is not satisfied, execution of the program is penalized as the pipeline flushes the target instruction and any fetched instructions following the target instruction when the conditional branch instruction is retired and restarts fetching and processing at the fall through instruction.

The pipeline may try to predict how the condition will be resolved, for example, based on prior executions of the same conditional branch instruction in the program. Typical pipelines, however, cannot accurately predict how every conditional branch instruction will be resolved every time and will therefore incur execution penalties due to branch mispredictions.

Software predicated instructions, such as a conditional move instruction for example, may be used to eliminate or reduce branch instructions and therefore avoid or minimize execution penalties associated with branch mispredictions. Software predication, however, requires compiler help to substitute code in eliminating branch instructions and an instruction set architecture that provides for the software predicated instructions.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for hardware predication for conditional instruction path branching. In the following description, details are set forth such as specific processor architecture, instruction processing techniques, etc., in order to provide a thorough understanding of the present invention. It will be evident, however, that the present invention may be practiced without these details. In other instances, well-known function blocks, interfaces, etc., have not been described in particular detail so as not to obscure the present invention.

Exemplary Computer System

Figure 1:
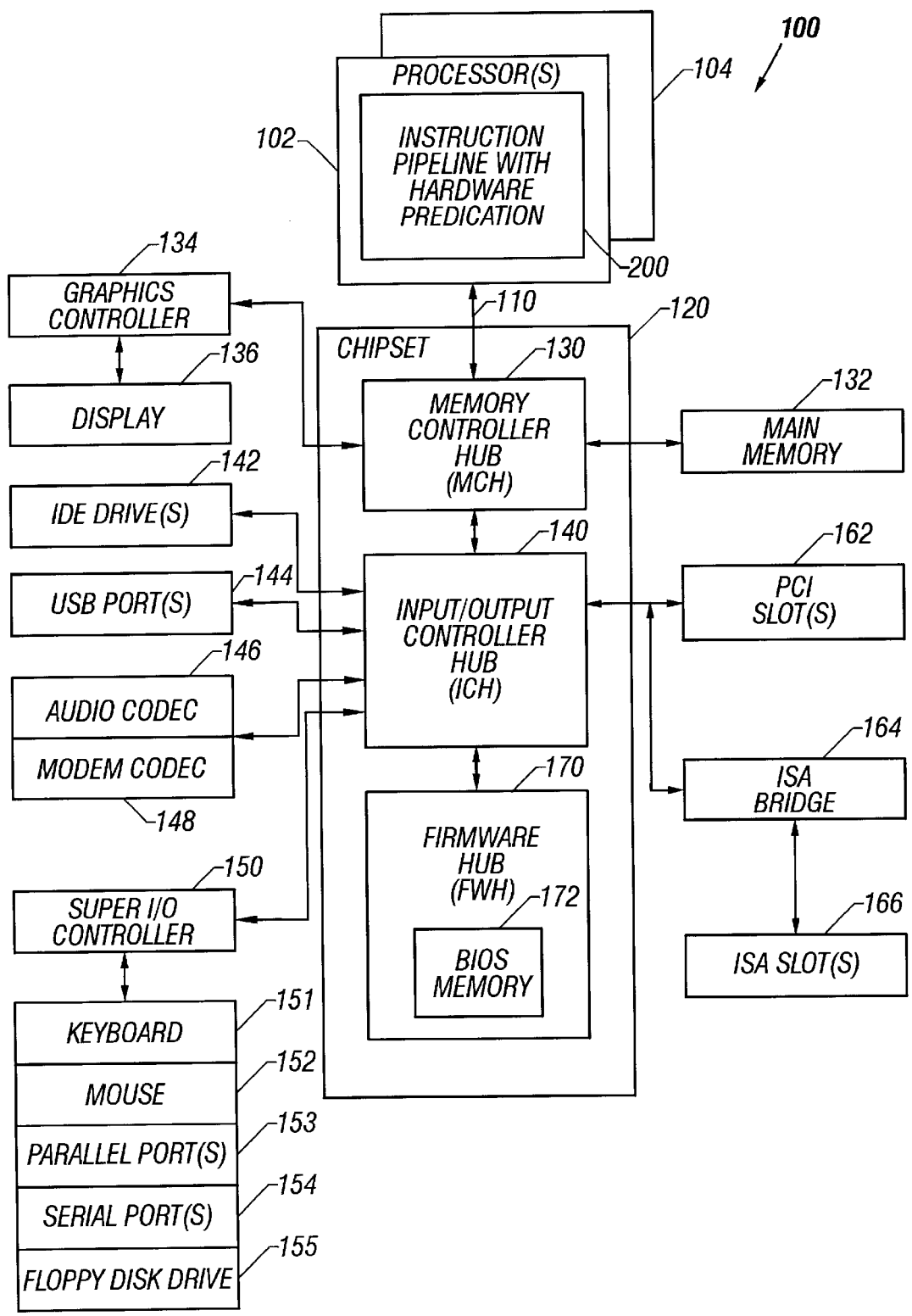
FIG. 1 illustrates an exemplary computer system comprising a processor having an instruction pipeline with hardware predication for conditional instruction path branching.

FIG. 1 illustrates an exemplary computer system 100 comprising a processor 102 having an instruction pipeline 200 with hardware predication for conditional instruction path branching in accordance with the present invention. Although described in the context of computer system 100, the present invention may be implemented in any suitable computer system comprising any suitable one or more integrated circuits.

As illustrated in FIG. 1, computer system 100 comprises another processor 104 that may also have an instruction pipeline with hardware predication for conditional instruction path branching, a processor bus 110, and a chipset 120. Processors 102 and 104 and chipset 120 are coupled to processor bus 110. Processors 102 and 104 may each comprise any suitable processor architecture and for one embodiment comprise an Intel® Architecture used, for example, in the Pentium® family of processors available from Intel® Corporation of Santa Clara, Calif. Computer system 100 for other embodiments may comprise one, three, or more processors any of which may comprise an instruction pipeline with hardware predication for conditional instruction path branching.

Chipset 120 for one embodiment comprises a memory controller hub (MCH) 130, an input/output (I/O) controller hub (ICH) 140, and a firmware hub (FWH) 170. MCH 130, ICH 140, and FWH 170 may each comprise any suitable circuitry and for one embodiment are each formed as a separate integrated circuit chip. Chipset 120 for other embodiments may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled to processor bus 110 and provides an interface to processors 102 and 104 over processor bus 110. Processor 102 and/or processor 104 may alternatively be combined with MCH 130 to form a single chip. MCH 130 for one embodiment also provides an interface to a main memory 132 and a graphics controller 134 each coupled to MCH 130. Main memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD) for example, coupled to graphics controller 134. MCH 130 for one embodiment interfaces with graphics controller 134 through an accelerated graphics port (AGP). Graphics controller 134 for one embodiment may alternatively be combined with MCH 130 to form a single chip.

MCH 130 is also coupled to ICH 140 to provide access to ICH 140 through a hub interface. ICH 140 provides an interface to I/O devices or peripheral components for computer system 100. ICH 140 may comprise any suitable interface controllers to provide for any suitable communication link to MCH 130 and/or to any suitable device or component in communication with ICH 140. ICH 140 for one embodiment provides suitable arbitration and buffering for each interface.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. ICH 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. ICH 140 for one embodiment further provides an interface to one or more suitable peripheral component interconnect (PCI) devices coupled to ICH 140 through one or more PCI slots 162 on a PCI bus and an interface to one or more suitable industry standard architecture (ISA) devices coupled to ICH 140 by the PCI bus through an ISA bridge 164. ISA bridge 164 interfaces with one or more ISA devices through one or more ISA slots 166 on an ISA bus.

ICH 140 is also coupled to FWH 170 to provide an interface to FWH 170. FWH 170 may comprise any suitable interface controller to provide for any suitable communication link to ICH 140. FWH 170 for one embodiment may share at least a portion of the interface between ICH 140 and super I/O controller 150. FWH 170 comprises a basic input/output system (BIOS) memory 172 to store suitable system and/or video BIOS software. BIOS memory 172 may comprise any suitable non-volatile memory, such as a flash memory for example.

Instruction Pipeline with Hardware Predication

Processor 102 comprises instruction pipeline 200 with hardware predication for conditional instruction path branching to help avoid or minimize any program execution penalty due to branch mispredictions.

Figure 2:
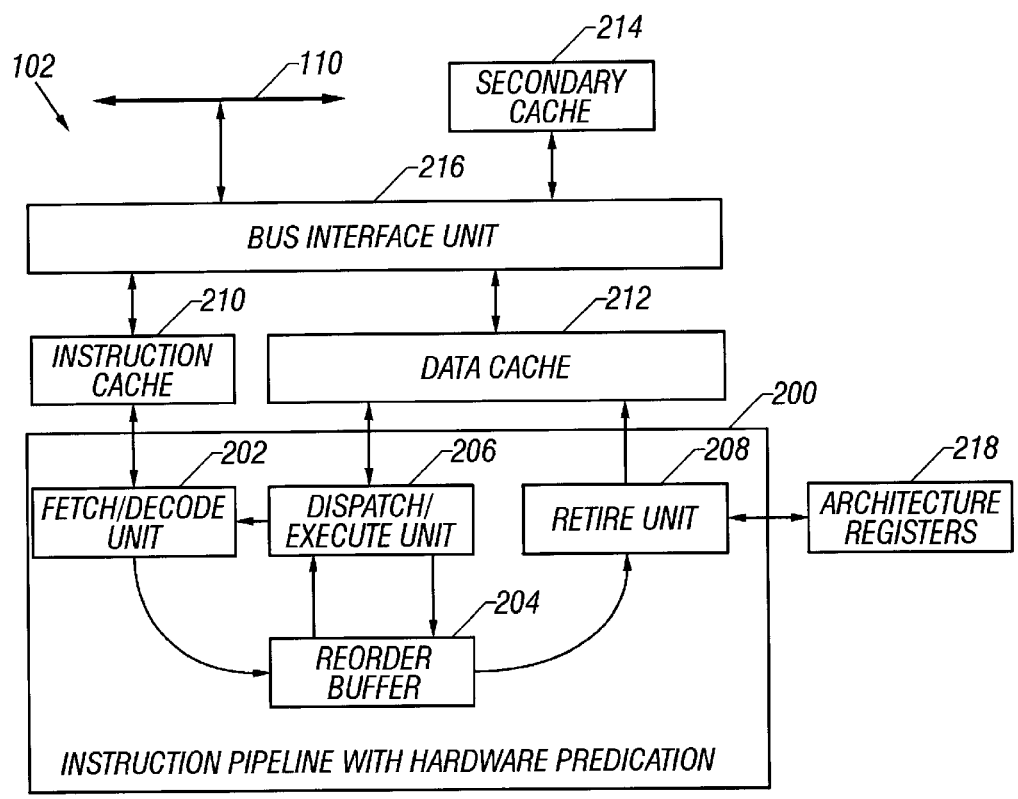
FIG. 2 illustrates, for one embodiment, a processor having an instruction pipeline with hardware predication for conditional instruction path branching.

As illustrated in FIG. 2, processor 102 for one embodiment comprises instruction pipeline 200 with hardware predication, instruction cache 210, data cache 212, secondary cache 214, bus interface unit 216, and processor architecture registers 218. Bus interface unit 216 couples system bus 110, instruction cache 210, data cache 212, and secondary cache 214 to one another. Instruction cache 210, data cache 212, and registers 218 are each coupled to instruction pipeline 200.

Instruction cache 210, data cache 212, and secondary cache 214 form a two cache level memory subsystem to help ensure a steady supply of instructions and data to instruction pipeline 200. Instruction cache 210 and data cache 212 are at a primary cache level and may be accessed relatively quickly as instruction cache 210 and data cache 212 are each relatively small in size and closely coupled to instruction pipeline 200. Secondary cache 214 is at a secondary cache level and stores more instructions and data for instruction pipeline 200 relative to instruction cache 210 and data cache 212 yet has a slower access time relative to instruction cache 210 and data cache 212.

Instruction cache 210 and/or secondary cache 214 store instructions accessed from main memory 132 through bus interface unit 216 for processing by instruction pipeline 200. Instruction cache 210 and/or secondary cache 214 may also store recently and/or frequently used instructions. Data cache 212 and secondary cache 214 store data accessed from main memory 132 through bus interface unit 216 for processing by instruction pipeline 200. Data cache 212 and/or secondary cache 214 may also store recently and/or frequently used data. Instruction cache 210, data cache 212, and secondary cache 214 may store instructions and/or data in accordance with any suitable caching scheme. Although described as comprising instruction cache 210, data cache 212, and secondary cache 214, processor 102 may comprise any other suitable memory subsystem for storing instructions and data for instruction pipeline 200.

Instruction pipeline 200 for one embodiment comprises a fetch/decode unit 202, a reorder buffer 204, a dispatch/execute unit 206, and a retire unit 208. Fetch/decode unit 202 is coupled to instruction cache 210. Reorder buffer 204 is coupled to fetch/decode unit 202, dispatch/execute unit 206, and retire unit 208. Dispatch/execute unit 206 is coupled to fetch/decode unit 202 and data cache 212. Retire unit 208 is coupled to data cache 212 and registers 218.

Figure 3:
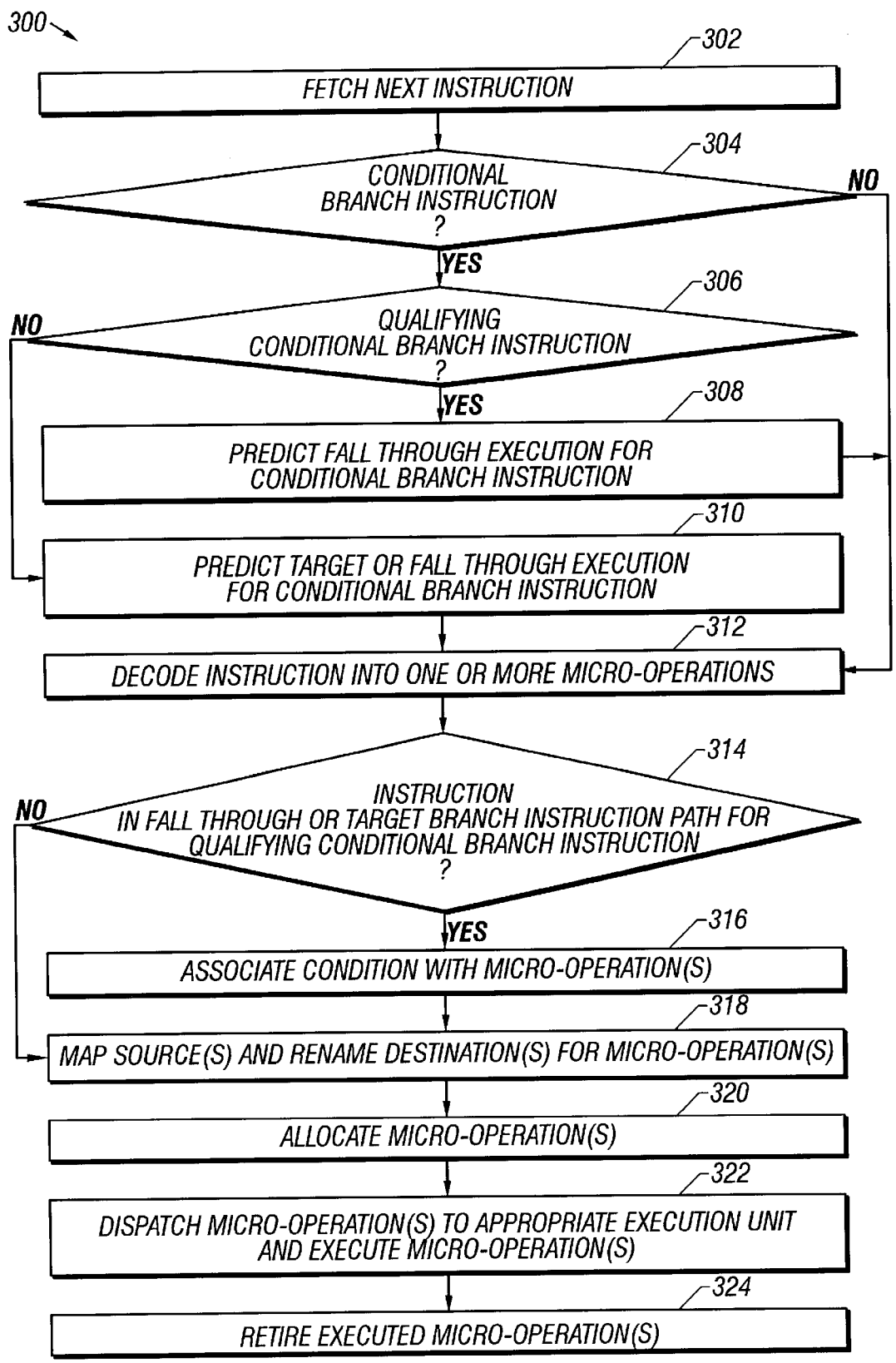
FIG. 3 illustrates, for one embodiment, a flow diagram for processing instructions with hardware predication for conditional instruction path branching.

Instruction pipeline 200 for one embodiment processes instructions of a program in accordance with a flow diagram 300 as illustrated in FIG. 3. Instruction pipeline 200 may process any suitable instruction at any suitable level, such as macro-instructions for example. The program for one embodiment defines a sequential order for the instructions of the program and comprises one or more conditional branch instructions. As used in this detailed description, a conditional branch instruction encompasses any instruction defined to alter the flow of execution of instructions of a program based on whether one or more conditions have been satisfied. Each conditional branch instruction for one embodiment identifies a condition and a target instruction that is to follow the conditional branch instruction if the condition is satisfied. The conditional branch instruction may identify any suitable condition and target instruction in any suitable manner. Conditional branch instructions are also known as conditional jump instructions, for example.

For block 302 of FIG. 3, fetch/decode unit 202 fetches a next instruction of a program from instruction cache 210. Fetch/decode unit 202 may fetch instructions from the program in any suitable manner.

Fetch/decode unit 202 for block 304 identifies whether the fetched instruction is a conditional branch instruction. If so, fetch/decode unit 202 for block 306 identifies whether the fetched instruction is a qualifying conditional branch instruction and, if so, for block 308 predicts fall through execution for the identified qualifying conditional branch instruction. The next instruction fetched by fetch/decode unit 202 will therefore be the instruction sequentially following the qualifying conditional branch instruction as defined by the program. Fetch/decode unit 202 may identify conditional branch instructions in any suitable manner and may define and identify qualifying conditional branch instructions in any suitable manner.

Fetch/decode unit 202 for one embodiment for block 306 identifies whether the fetched instruction is a conditional forward branch instruction, that is whether a target instruction identified by the conditional branch instruction is positioned after the conditional branch instruction in the sequential order of instructions as defined by the program. Fetch/decode unit 202 for one embodiment for block 306 identifies whether the fetched instruction is a conditional branch instruction identifying a target instruction within a suitable predetermined number of instructions from the conditional branch instruction. Fetch/decode unit 202 for one embodiment for block 306 identifies how predictable the identified conditional branch instruction is, for example, by determining how often the condition is resolved in the same manner each time the conditional branch instruction is executed. If fetch/decode unit 202 for block 306 identifies a conditional branch instruction as a conditional forward branch instruction, as identifying a target instruction within a suitable predetermined number of instructions from the conditional branch instruction, and/or as not being predictable within a suitable predetermined degree of accuracy, fetch/decode unit 202 for block 308 predicts fall through execution for the identified conditional branch instruction.

If the fetched instruction is identified as a conditional branch instruction for block 304 yet is not a qualifying conditional branch instruction as determined for block 306, fetch/decode unit 202 for block 310 predicts either the identified target instruction or the fall through instruction will follow at the risk of penalizing the execution of the program if the wrong instruction was selected. Fetch/decode unit 202 may perform such branch predictions for block 310 in any suitable manner.

Fetch/decode unit 202 for block 312 decodes the fetched instruction into one or more micro-operations. Fetch/decode unit 202 may decode instructions into any suitable one or more micro-operations in any suitable manner. Although described in the context of micro-operations, fetch/decode unit 202 for other embodiments may decode the fetched instruction into any suitable one or more instructions at any suitable one or more instruction levels.

Fetch/decode unit 202 for block 314 determines whether the fetched instruction is in a fall through branch instruction path or any target branch instruction path for an identified qualifying conditional branch instruction. A fall through branch instruction path for a conditional branch instruction comprises one or more instructions that are executed only if a condition for the conditional branch instruction is not satisfied. A target branch instruction path for a conditional branch instruction comprises one or more instructions that are executed only if a condition for the conditional branch instruction is satisfied. Because the target instruction for a conditional branch instruction may be executed regardless of how a condition for the conditional branch instruction is resolved, each conditional branch instruction may not have a target branch instruction path. Fetch/decode unit 202 may identify instructions in a fall through branch instruction path and in any target branch instruction path in any suitable manner.

If the fetched instruction is in the fall through branch instruction path or any target branch instruction path for an identified qualifying conditional branch instruction, fetch/decode unit 202 for block 316 associates a condition for the qualifying conditional branch instruction with each micro-operation for the fetched instruction. Fetch/decode unit 202 may associate the condition with each micro-operation for the fetched instruction in any suitable manner. In decoding a fetched instruction into one or more micro-operations and associating a condition with each such micro-operation, fetch/decode unit 202 effectively decodes the fetched instruction into one or more conditional micro-operations.

As an illustration as to how a condition is associated with one or more fetched instructions, an exemplary program fragment contains the following instructions:

|  | JC (Target1) |
|  | ADD S1,S2 |
|  | DEC S1 |
| Target1: | SUB S1,S2 | where JC (Target1) designates to jump or branch to the instruction at Target1 if condition C is satisfied or to continue with the next sequential instruction if condition C is not satisfied, ADD S1,S2 designates to add the content of logical register S1 to that of logical register S2 and store the sum in logical register S1, DEC S1 designates to decrement the content of logical register S1, and SUB S1,S2 designates to subtract the content of logical register S2 from that of logical register S1 and store the difference in logical register S1.

When fetch/decode unit 202 fetches the conditional branch instruction JC (Target1), fetch/decode unit 202 for this illustration identifies JC (Target1) as a qualifying conditional branch instruction, for example, because JC (Target1) is a forward conditional branch instruction, identifies the target instruction SUB S1,S2 within five instructions of JC (Target1), and is not predictable within a predetermined degree of accuracy. Fetch/decode unit 202 predicts fall through execution for JC (Target1) and therefore continues fetching instructions in sequential order as defined by the program. As fetch/decode unit 202 fetches and decodes the instructions in the fall through branch instruction path for JC (Target1), fetch/decode unit 202 associates the condition C with the one or more micro-operations for each such instruction, effectively associating the condition C with each such instruction as follows.

|  | JC (Target1) |
|  | ADD S1,S2/C' |
|  | DEC S1/C' |
| Target1: | SUB S1,S2 |

The condition C is illustrated in inverse form, that is as C', because the instructions in the fall through branch instruction path are to be executed only if the condition C is not satisfied.

Because the target instruction SUB S1,S2 is to be executed regardless of how the condition C is resolved, the conditional branch instruction JC (Target1) does not have a target branch instruction path in this illustration.

As another illustration as to how a condition is associated with one or more fetched instructions, an exemplary program fragment contains the following instructions:

|  | JC (Target1) |
|  | ADD S1,S2 |
|  | DEC S1 |
|  | JMP Target2 |
| Target1: | SUB S1,S2 |
| Target2: | MUL S4,S5 | where JMP Target2 designates to unconditionally jump to the instruction at Target2 and MUL S4,S5 designates to multiply the content of logical register S4 by that of logical register S5 and store the product in logical register S4.

As fetch/decode unit 202 fetches and decodes the instructions in the fall through branch instruction path for JC (Target1) and the instruction in the target branch instruction path for JC (Target1), fetch/decode unit 202 associates the condition C with the one or more micro-operations for each such instruction, effectively associating the condition C with each such instruction as follows.

|  | JC (Target1) |
|  | ADD S1,S2/C' |
|  | DEC S1/C' |
|  | JMP Target2/C' |
| Target1: | SUB S1,S2/C |
| Target2: | MUL S4,S5 |

The instruction in the target branch instruction path, that is SUB S1,S2, is to be executed only if the condition C is satisfied.

Fetch/decode unit 202 for block 318 maps any sources and renames any destinations for each micro-operation for the fetched instruction. Fetch/decode unit-202 may perform mapping and renaming in any suitable manner.

Fetch/decode unit 202 for block 320 allocates each micro-operation for the fetched instruction in reorder buffer 204. Fetch/decode unit 202 may allocate each micro-operation in reorder buffer 204 in any suitable manner.

Figure 4:
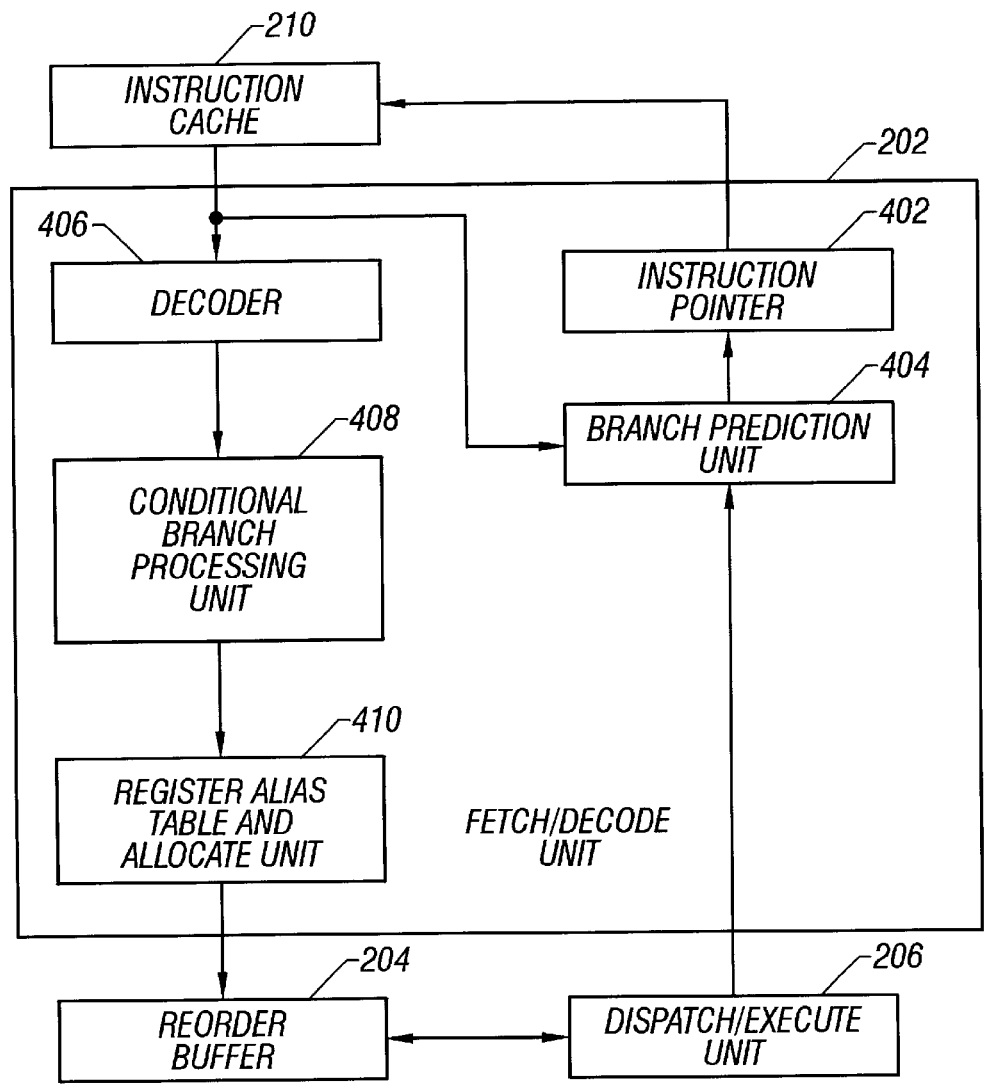
FIG. 4 illustrates, for one embodiment, a fetch/decode unit for the instruction pipeline of FIG. 3.

Fetch/decode unit 202 may comprise any suitable circuitry. As illustrated in FIG. 4, fetch/decode unit 202 for one embodiment comprises an instruction pointer 402, a branch prediction unit 404, a decoder 406, a conditional branch processing unit 408, and a register alias table (RAT) and allocate unit 410.

Fetch/decode unit 202 controls instruction pointer 402 to identify for block 302 the next instruction to be fetched from instruction cache 210 based on inputs, for example, from branch prediction unit 404, exception/interrupt status, and/or branch misprediction indications from dispatch/execute unit 206.

Branch prediction unit 404 receives fetched instructions from instruction cache 210, identifies each fetched conditional branch instruction for block 304, and predicts for block 310 either a target instruction or the fall through instruction for the conditional branch instruction is to be fetched next. Branch prediction unit 404 may perform branch predictions in any suitable manner. Branch prediction unit 404 for one embodiment identifies qualifying conditional branch instructions for block 306 and predicts fall through execution for block 308. Branch prediction unit 404 is coupled to instruction cache 210, instruction pointer 402, and dispatch/execute unit 206 and may comprise any suitable circuitry.

Decoder 406 is coupled to instruction cache 210 and receives and decodes each fetched instruction into one or more micro-operations for block 312. Decoder 406 may comprise any suitable circuitry to decode each fetched instruction into any suitable one or more micro-operations in any suitable manner. Decoder 406 for one embodiment decodes each instruction into one or more triadic micro-operations. A triadic micro-operation comprises an operation code or opcode and may comprise up to two logical source operands and one logical destination operand.

Decoder 406 for one embodiment tags a micro-operation for each qualifying conditional branch instruction to identify the qualifying conditional branch to conditional branch processing unit 408 and dispatch/execute unit 206. Each qualifying conditional branch may be identified in any suitable manner by branch prediction unit 404 and/or decoder 406. Decoder 406 may also decode each qualifying conditional branch instruction in a suitable manner so as to distinguish micro-operations for qualifying conditional branch instructions from other conditional branch instructions.

Decoder 406 for one embodiment tags a micro-operation for each conditional branch instruction that is not a qualifying conditional branch instruction with suitable information identifying the fall through branch instruction path and the predicted instruction path for the conditional branch instruction to help dispatch/execute unit 206 identify branch mispredictions. The fall through branch instruction path and the predicted instruction path may be identified in any suitable manner by branch prediction unit 404 and/or decoder 406.

Conditional branch processing unit 408 receives micro-operations from decoder 406, identifies micro-operations in the fall through branch instruction path and in any target branch instruction path for a qualifying conditional branch instruction for block 314, and associates a condition for the qualifying conditional branch instruction with each such identified micro-operation for block 316. Conditional branch processing unit 408 for one embodiment identifies qualifying conditional branch instructions based on micro-operations received from decoder 406. Conditional branch processing unit 408 is coupled to decoder 406 and may comprise any suitable circuitry to identify micro-operations in the fall through branch instruction path and in any target branch instruction path for a qualifying conditional branch instruction and to associate a condition for the qualifying conditional branch instruction with each such identified micro-operation in any suitable manner. Conditional branch processing unit 408 for one embodiment tags each such identified micro-operation with a conditional flag identifying the condition as an additional source operand for the micro-operation.

RAT and allocate unit 410 receives micro-operations from conditional branch processing unit 408 and maps any sources and renames any destinations for each micro-operation for block 318. RAT and allocate unit 410 for one embodiment for block 318 converts logical register references to physical register references and in so doing forms dependency links between physical destinations and sources-using a rename map. For one embodiment where conditional branch processing unit 408 tags a micro-operation with a conditional flag identifying a condition for a qualifying conditional branch instruction, RAT and allocate unit 410 attaches to the tagged micro-operation an identifier of the same physical flag register upon which the qualifying conditional branch instruction depends.

As an example, fetch/decode unit 202 may decode, map, and rename the macro-instruction ADD Ldest,Lsource from a fall through branch instruction path for a qualifying conditional branch instruction into the micro-operation ADD Pdest4←(Pdest1, Pdest2), Pdest3:flag, where Ldest is a logical destination register, Lsource is a logical source register, ADD Ldest,Lsource designates to add the content of logical register Ldest to that of logical register Lsource and store the sum in logical register Ldest, Pdest4 is a physical destination register to store the result of the ADD instruction, Pdest1 is a physical destination register corresponding to logical register Lsource, Pdest2 is a physical destination register corresponding to logical register Ldest, and Pdest3 is a physical destination register corresponding to a flag register to store a conditional flag upon which the qualifying conditional branch instruction depends.

RAT and allocate unit 410 also allocates each micro-operation in reorder buffer 204 for block 320. In entering micro-operations in reorder buffer 204, RAT and allocate unit 410 for one embodiment for block 320 adds status information to the micro-operations to prepare them for out-of-order execution.

RAT and allocate unit 410 is coupled to conditional branch processing unit 408 and reorder buffer 204 and may comprise any suitable circuitry to perform mapping, renaming, and allocation in any suitable manner.

Reorder buffer 204 receives and stores each micro-operation from fetch/decode unit 202. Reorder buffer 204 also stores micro-operations that have already been executed by dispatch/execute unit 206 but not yet retired. Reorder buffer 204 may comprise any suitable circuitry and for one embodiment comprises an array of content-addressable memory (CAM).

Dispatch/execute unit 206 for block 322 of FIG. 3 dispatches micro-operations stored in reorder buffer 204 for execution and executes dispatched micro-operations. Dispatch/execute unit 206 schedules and executes micro-operations stored in reorder buffer 204 in accordance with data dependencies among such micro-operations and execution resource availability and therefore supports out-of-order execution of micro-operations. Dispatch/execute unit 206 stores any result of executing a micro-operation with that micro-operation in reorder buffer 204.

Figure 5:
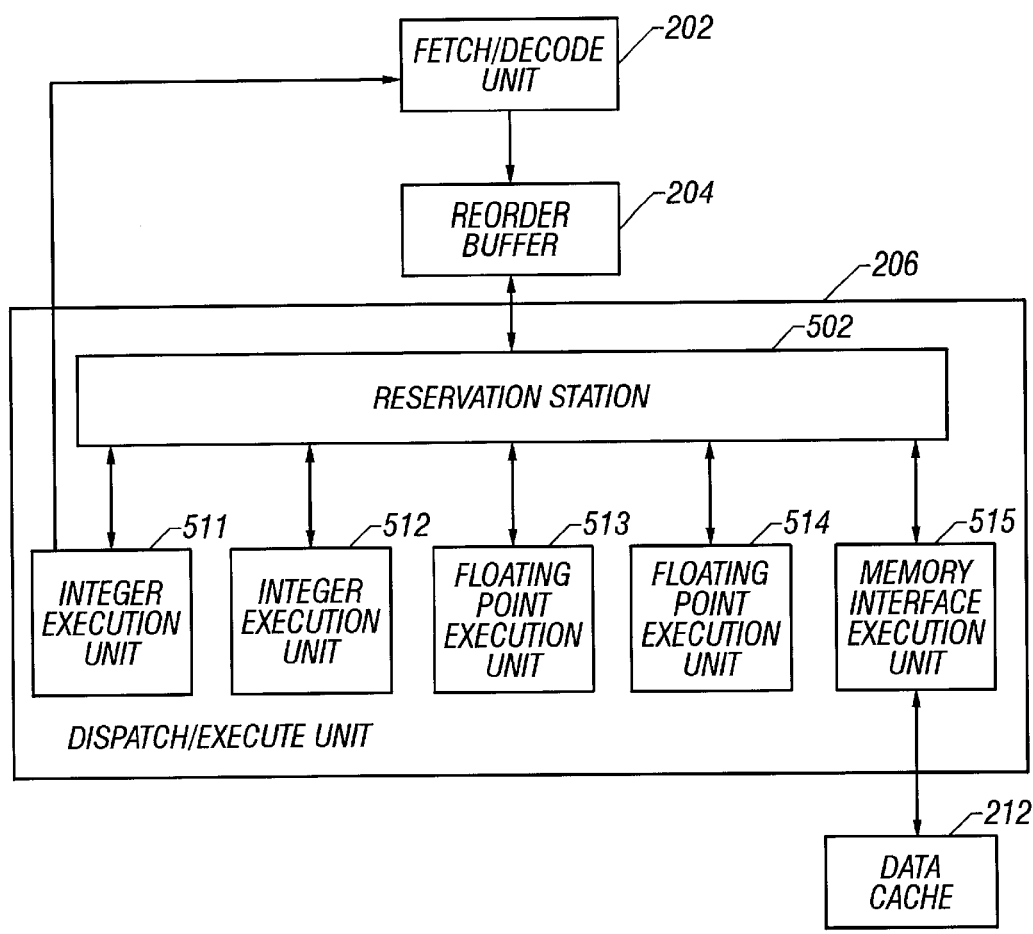
FIG. 5 illustrates, for one embodiment, a dispatch/execute unit for the instruction pipeline of FIG. 3.

Dispatch/execute unit 206 may comprise any suitable circuitry. As illustrated in FIG. 5, dispatch/execute unit 206 for one embodiment comprises a reservation station 502, integer execution units 511 and 512, floating point execution units 513 and 514, and a memory interface execution unit 515. Each execution unit 511–515 is coupled to reservation station 502. Although illustrated as comprising five execution units 511–515, dispatch/execute unit 206 for other embodiments may comprise any suitable number of execution units each of which may execute any suitable type of micro-operation.

Reservation station 502 is coupled to reorder buffer 204 and scans the status of micro-operations in reorder buffer 204 to identify micro-operations that are ready to be executed, such as micro-operations having available source operands for example. Reservation station 502 for block 322 dispatches each ready micro-operation to an appropriate execution unit 511, 512, 513, 514, or 515 available to execute the micro-operation. Each execution unit 511–515 returns any result of executing a micro-operation to reorder buffer 204, either directly or through reservation station 502, to store the result with the corresponding micro-operation in reorder buffer 204.

Retire unit 208 retires executed micro-operations for block 324 of FIG. 3. Retire unit 208 for one embodiment scans the status of micro-operations in reorder buffer 204, removes executed micro-operations from reorder buffer 204, and commits the results of executed micro-operations to machine state, that is to registers 218 and to main memory 132 through data cache 212. Retire unit 208 for one embodiment retires executed micro-operations in accordance with the order in which their respective instructions were fetched and decoded by fetch/decode unit 202. Retire unit 208 may comprise any suitable circuitry to retire executed micro-operations in any suitable manner.

Although described in the context of instruction pipeline 200 as illustrated in FIGS. 2, 4, and 5 and in the context of flow diagram 300 of FIG. 3, the present invention may be implemented using any other suitable pipeline architecture that processes instructions in accordance with any suitable flow diagram.

For another embodiment, for example, fetch/decode unit 202 may allocate micro-operations in reservation station 502, for example, of dispatch/execute unit 206 rather than in reorder buffer 204 for block-320 of FIG. 3. Upon dispatching and executing allocated micro-operations, dispatch/execute unit 206 may then store any results in reorder buffer 204 for retirement by retire unit 208.

Instruction pipeline 200 for another embodiment may not decode any instructions fetched for block 302 of FIG. 3 into micro-operations but rather may process each instruction directly for blocks 314–324.

Conditional Branch Instruction Execution

In executing and retiring conditional branch instructions that are not qualifying conditional branch instructions as determined for block 306 of FIG. 3, dispatch/execute unit 206 for one embodiment detects any branch mispredictions, flushes from reorder buffer 204 any micro-operation(s) for the instruction(s) in the mispredicted instruction path, and signals fetch/decode unit 202 to restart fetching instructions along the appropriate instruction path. For one embodiment, fetch/decode unit 202 tags a micro-operation for each such conditional branch instruction with information identifying the fall through branch instruction path and the predicted instruction path for the conditional branch instruction. Upon execution of the conditional branch instruction, dispatch/execute unit 206 may then determine whether the prediction was correct. For one embodiment, as illustrated in FIG. 5, integer execution unit 511 handles executing micro-operations for conditional branch instructions in this manner.

For each qualifying conditional branch instruction as-determined for block 306 of FIG. 3, any program execution penalty due to a branch misprediction is avoided or minimized as instruction pipeline 200 continues to fetch instructions sequentially following the qualifying conditional branch instruction and processes each instruction in the fall through branch instruction path and in any target branch instruction path for the qualifying conditional branch instruction as a conditional instruction regardless of whether the fall through instruction or the target instruction is to follow the qualifying conditional branch instruction. In this manner, any flushing of instructions from instruction pipeline 200 and any refetching of instructions due to a branch misprediction is avoided.

Unlike using software predication, instruction pipeline 200 may execute instructions of existing instruction set architectures from existing programs without additional compiler help to substitute code in eliminating branch instructions.

Dispatch/execute unit 206 for one embodiment identifies a micro-operation for a qualifying conditional branch instruction based on how fetch/decode unit 202 decoded and/or tagged the conditional branch instruction. As dispatch/execute unit 206 is to execute each conditional micro-operation in the fall through branch instruction path and in any target branch instruction path for the qualifying conditional branch instruction, dispatch/execute unit 206 does not signal fetch/decode unit 202 to restart instruction fetching despite a branch misprediction.

Dispatch/execute unit 206 executes each conditional micro-operation by performing both the operation designated by the conditional micro-operation in accordance with the instruction from which the conditional micro-operation was decoded to produce a first result and an execution bypass operation to produce a second result the retiring of which preserves the machine state as if the conditional micro-operation was not executed. The first result or the second result for each conditional micro-operation is committed to machine state based on how the condition associated with the conditional micro-operation was resolved.

Dispatch/execute unit 206 may perform any suitable execution bypass operation. For one embodiment where each of one or more instructions use the same logical operand as both a source and a destination for the instruction and fetch/decode unit 202 maps the logical source to one physical location and the destination to another physical location, dispatch/execute unit 206 performs an execution bypass operation by moving or copying the data at the source physical location to the destination physical location.

As one example, the instruction ADD S1,S2 is in the fall through branch instruction path of a qualifying conditional branch instruction and designates to add the content of logical register S1 to that of logical register S2 and store the sum in logical register S1. Fetch/decode unit 202 decodes this instruction into the conditional micro-operation ADD Pdest4←(Pdest1, Pdest2), Pdest3:flag, where Pdest4 is a physical destination register to store the result of the ADD instruction, Pdest1 is a physical destination register corresponding to logical register S1, Pdest2 is a physical destination register corresponding to logical register S2, and Pdest3 is a physical destination register corresponding to a flag register to store a conditional flag upon which the qualifying conditional branch instruction depends.

If the ADD S1,S2 instruction is to be executed and retired, execution and retirement of the conditional micro-operation adds the data at Pdest1 to that at Pdest2 and stores the sum at Pdest4. If the ADD S1,S2 instruction is not be executed, execution and retirement of the conditional micro-operation moves or copies the data at Pdest1 to Pdest4. Because logical register S1 corresponds to both Pdest1 and Pdest4, moving or copying the data at Pdest1 to Pdest4 effectively does not change logical register S1 for the ADD S1,S2 instruction and therefore preserves the machine state as if no micro-operation was executed and retired.

For one embodiment where each of one or more instructions do not use a destination as a source operand, such as a load instruction for example, fetch/decode unit 202 may then add a destination as a source operand to the instruction in decoding the instruction into one or more conditional micro-operations. Decoder 406, conditional branch processing unit 408, and/or RAT and allocate unit 410 of FIG. 4, for example, may add the destination as a source operand.

Conditional Execution with Destination Bypassing

Figure 6:
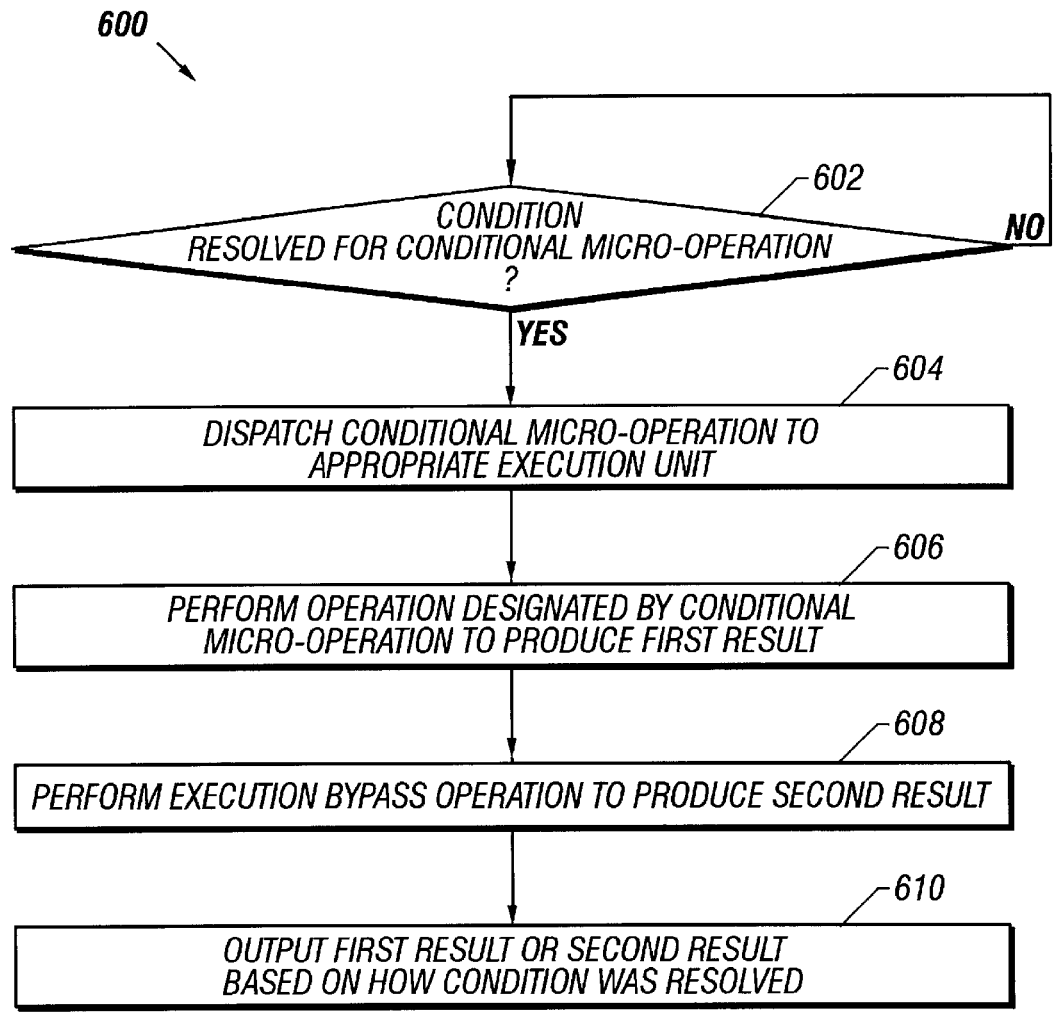
FIG. 6 illustrates, for one embodiment, a flow diagram for dispatching and executing conditional micro-operations.

Dispatch/execute unit 206 for one embodiment for block 322 dispatches and executes a conditional micro-operation in accordance with a flow diagram 600 as illustrated in FIG. 6.

For block 602 of FIG. 6, dispatch/execute unit 206 determines whether a condition associated with the conditional micro-operation has been resolved. Dispatch/execute unit 206 may determine whether the condition has been resolved in any suitable manner. For one embodiment where a conditional micro-operation is tagged with a conditional flag as an additional source operand, the conditional flag is captured when written upon execution of a micro-operation modifying the conditional flag. Dispatch/execute unit 206 may then determine the condition has been resolved in scanning the status of the conditional micro-operation and determining this additional source operand has been validated.

Dispatch/execute unit 206 dispatches the conditional micro-operation for execution for block 604 when the condition for the conditional micro-operation has been resolved as determined for block 602 and when the conditional micro-operation is otherwise ready to be executed. Dispatch/execute unit 206 for one embodiment dispatches the conditional micro- operation to an appropriate execution unit based on the operation designated by the conditional micro-operation.

Dispatch/execute unit 206 executes the conditional micro-operation by performing the operation designated by the conditional micro-operation to produce a first result for block 606 and by performing an execution bypass operation to produce a second result for block 608. Dispatch/execute unit 206 for one embodiment for block 606 performs the operation designated by the conditional micro-operation on one or more source operands for the conditional micro-operation to produce the first result. Dispatch/execute unit 206 for one embodiment for block 608 performs an execution bypass operation by presenting a source operand for the conditional micro-operation as the second result.

Dispatch/execute unit 206 for block 610 outputs either the first result or the second result as the result of executing the conditional micro-operation based on how the condition was resolved. Dispatch/execute unit 206 outputs the first result if the condition was resolved such that the instruction from which the conditional micro-operation was decoded is to be executed. Dispatch/execute unit 206 outputs the second result if the condition was resolved such that the instruction from which the conditional micro-operation was decoded is not to be executed. In retiring the conditional micro-operation, retire unit 208 for one embodiment stores the output result in a location designated by a destination operand for the conditional micro-operation.

As an illustration as to how dispatch/execute unit 206 executes a conditional micro-operation in accordance with flow diagram 600 of FIG. 6, an exemplary instruction ADD S1,S2 designates to add the content of logical register S1 to that of logical register S2 and store the result in logical register S1 and is decoded and renamed into the conditional micro-operation ADD Pdest4 ←(Pdest1, Pdest2), Pdest3:flag. When the condition identified by Pdest3:flag is resolved and the source operands identified by Pdest1 and Pdest2 are available, dispatch/execute unit 206 dispatches the conditional micro-operation for execution.

In executing the conditional micro-operation, dispatch/execute unit 206 adds the source operands identified by Pdest1 and Pdest2 to produce a first result and presents the source operand identified by Pdest1 as a second result. If the condition identified by Pdest3:flag was resolved such that the instruction ADD S1,S2 is to be executed, dispatch/execute unit 206 outputs the first result as the result of executing the conditional micro-operation. If the condition identified by Pdest3:flag was resolved such that the instruction ADD S1,S2 is not to be executed, dispatch/execute unit 206 outputs the second result as the result of executing the conditional micro-operation. In retiring the conditional micro-operation, retire unit 208 stores the output result in a location designated by the destination operand identified by Pdest4.

If the condition identified by Pdest3:flag is resolved such that the instruction ADD S1,S2 is not to be executed, dispatch/execute unit 206 for one embodiment may dispatch the conditional micro-operation for execution when the source operand identified by Pdest1 is available regardless of whether the source operand identified by Pdest2 is available.

Dispatch/execute unit 206 may execute conditional micro-operations in accordance with flow diagram 600 of FIG. 6 using any suitable circuitry. Dispatch/execute unit 206 for one embodiment dispatches a conditional micro-operation to an execution unit comprising circuitry to perform the operation designated by the conditional micro-operation to produce a first result and circuitry to perform the execution bypass operation to produce a second result. An execution unit also comprises circuitry to output the first result or the second result based on how the condition associated with the conditional micro-operation is resolved.

Figure 7:
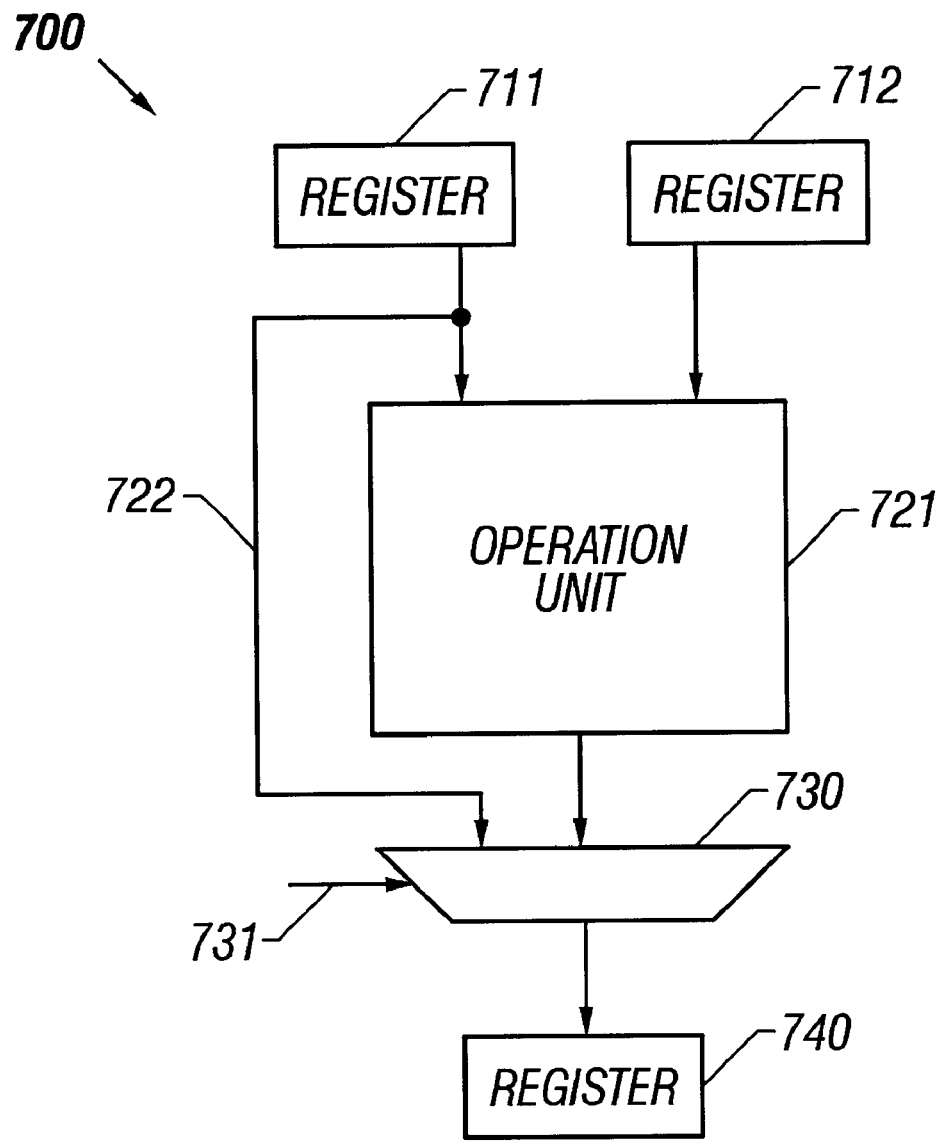
FIG. 7 illustrates, for one embodiment, conditional execution circuitry with destination bypassing.

FIG. 7 illustrates, for one embodiment, conditional execution circuitry 700 with destination bypassing for an execution unit. Conditional execution circuitry 700 may be implemented in any suitable one or more execution units, such as an integer execution unit and/or a floating point execution unit for example.

Conditional execution circuitry 700 comprises a register 711 to store a first source operand in a conditional micro-operation and a register 712 to store a second source operand, if any, in the conditional micro-operation. The output of each register 711 and 712 is coupled to a respective input of an operation unit 721 for performing the operation designated by the conditional micro-operation. Operation unit 721 may comprise any suitable circuitry to perform any suitable operation designated by a micro-operation. Operation unit 721 may comprise, for example, an integer arithmetic logic unit (ALU). The output of operation unit 721 is coupled to an input of a multiplexer 730 and presents a first result to multiplexer 730. The output of register 711 is also coupled to an input of multiplexer 730 by an execution bypass bus 722 and presents a second result to multiplexer 730. An execution unit comprising conditional execution circuitry 700, for one embodiment, generates a control input 731 based on a condition associated with the conditional micro-operation. Multiplexer 730 selectively outputs either the first result or the second result to a result register 740 based on control input 731.

For one embodiment, conditional execution circuitry 700 may also be used in normally executing micro-operations designating a suitable operation that may be performed by operation unit 721. Each such micro-operation may be executed by an execution unit comprising conditional execution circuitry 700 such that the control input to multiplexer 730 controls multiplexer 730 to output the result from operation unit 721.

An execution unit comprising conditional execution circuitry 700, for one embodiment, outputs the first and/or second results from result register 740 for storage in reorder buffer 204.

Dual Execution with Destination Bypassing

Figure 8:
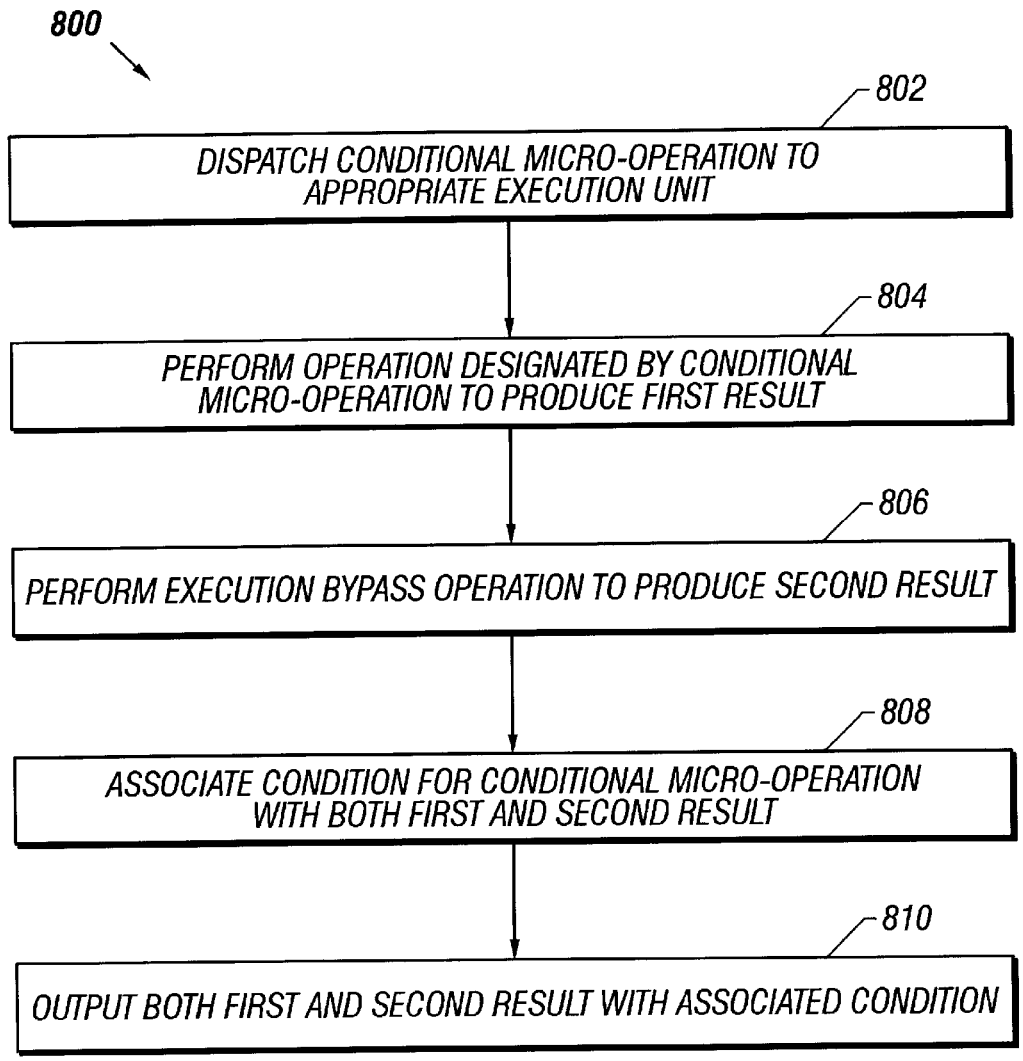
FIG. 8 illustrates, for another embodiment, a flow diagram for dispatching and executing conditional micro-operations.

Dispatch/execute unit 206 for another embodiment for block 322 dispatches and executes a conditional micro-operation in accordance with a flow diagram 800 as illustrated in FIG. 8.

For block 802 of FIG. 8, dispatch/execute unit 206 dispatches the conditional micro-operation for execution when the conditional micro-operation is ready to be executed regardless of whether a condition associated with the conditional micro-operation has been resolved. Dispatch/execute unit 206 for one embodiment dispatches the conditional micro-operation to an appropriate execution unit based on the operation designated by the conditional micro-operation.

Dispatch/execute unit 206 executes the conditional micro-operation by performing the operation designated by the conditional micro-operation to produce a first result for block 804 and by performing an execution bypass operation to produce a second result for block 806. Dispatch/execute unit 206 for one embodiment for block 804 performs the operation designated by the conditional micro-operation on one or more source operands for the conditional micro-operation to produce the first result. Dispatch/execute unit 206 for one embodiment for block 806 performs an execution bypass operation by presenting a source operand for the conditional micro-operation as the second result.

Dispatch/execute unit 206 for block 808 associates the condition associated with the conditional micro-operation with both the first result and the second result and for block 810 outputs both the first result and the second result with the associated condition. Dispatch/execute unit 206 for one embodiment stores the first result, the second result, and a conditional flag identifying the associated condition in reorder buffer 204. The conditional flag is captured when written upon execution of a micro-operation modifying the conditional flag. In retiring the conditional micro-operation, retire unit 208 for one embodiment may then scan the status of the conditional micro-operation, determine whether the associated condition has been resolved by determining whether the conditional flag has been validated, and commit either the first result or the second result to machine state based on how the condition was resolved.

Retire unit 208 commits the first result to machine state if the associated condition is resolved such that the instruction from which the conditional micro-operation was decoded is to be executed. Retire unit 208 commits the second result to machine state if the associated condition is resolved such that the instruction from which the conditional micro-operation was decoded is not to be executed.

By executing the conditional micro-operation in accordance with flow diagram 800 of FIG. 8, dispatch/execute unit 206 better tolerates delays in resolving a condition associated with the conditional micro-operation and therefore helps avoid or minimize any stalling in executing micro-operations.

If the condition associated with the conditional micro-operation has already been resolved when dispatch/execute unit 206 dispatches the conditional micro-operation, dispatch/execute unit 206 for one embodiment executes the conditional micro-operation to output only the appropriate first or second result in association with the resolved condition. Dispatch/execute unit 206 for another embodiment executes the conditional micro-operation to output both the first and second results in association with the resolved condition.

Dispatch/execute unit 206 for one embodiment may continue executing any micro-operations that depend on an already speculatively executed conditional micro-operation regardless of whether a condition associated with the conditional micro-operation has been resolved. For one embodiment, any source operands depending on the execution of the speculatively executed conditional micro-operation are validated when the first and/or second results are output in association with the condition for the speculatively executed conditional micro-operation.

Because conditional micro-operations in the same branch instruction path are associated with the same condition, dispatch/execute unit 206 for one embodiment may execute a conditional micro-operation that depends on another conditional micro-operation in the same branch instruction path by executing the dependent conditional micro-operation in accordance with flow diagram 800 of FIG. 8, for example, using the first result produced from executing the other conditional micro-operation. Dispatch/execute unit 206 for one embodiment identifies a dependent conditional micro-operation in the same branch instruction path based on the condition associated with the dependent conditional micro-operation and the condition associated with the first and/or second results for the conditional micro-operation upon which the dependent conditional micro-operation depends.

Dispatch/execute unit 206 may also execute micro-operations that depend on a conditional micro-operation from outside the branch instruction path for the conditional micro-operation. Dispatch/execute unit 206 for one embodiment for block 322 dispatches and executes such a dependent micro-operation in accordance with a flow diagram 900 as illustrated in FIG. 9.

Figure 9:
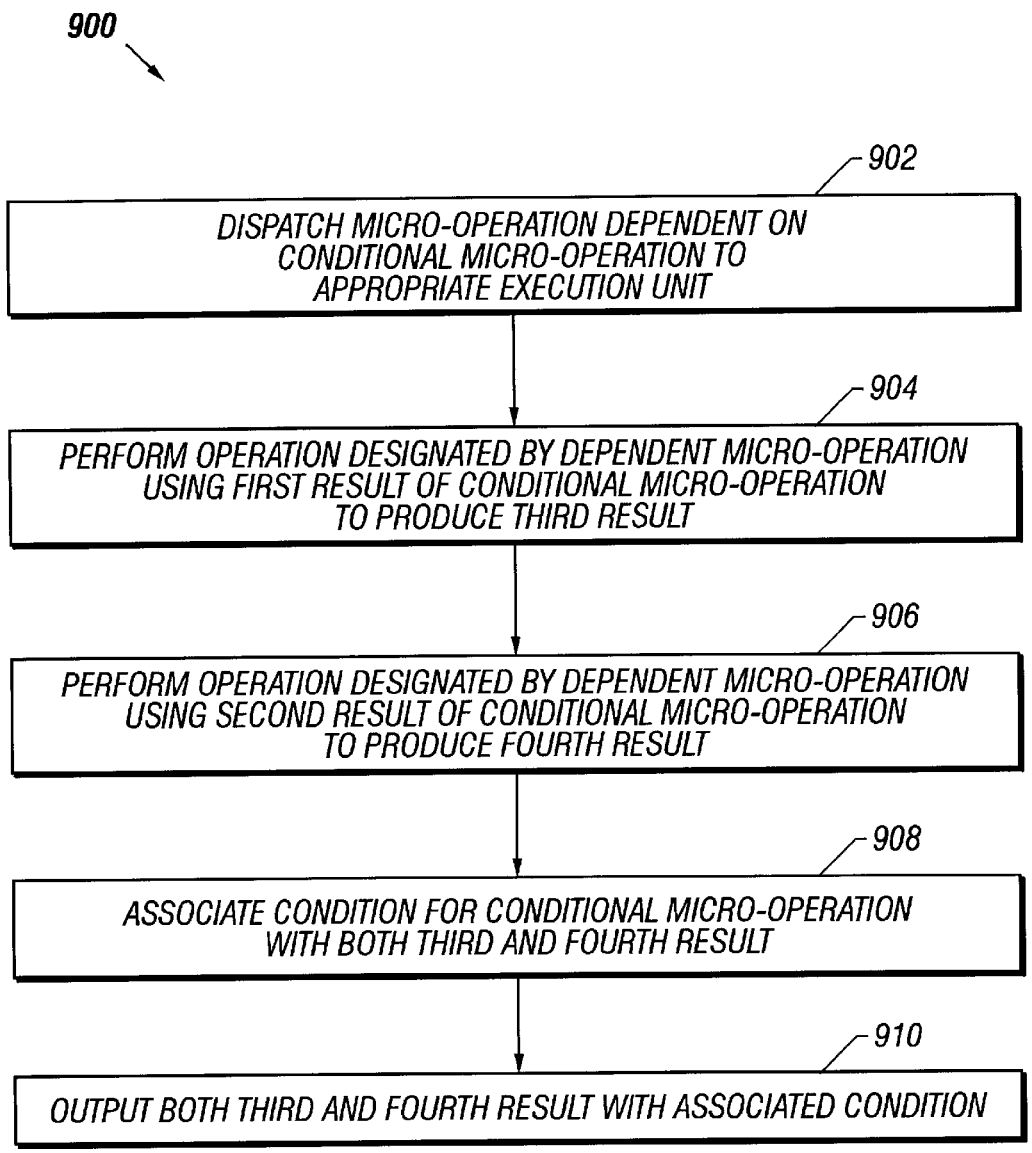
FIG. 9 illustrates, for one embodiment, a flow diagram for dispatching and executing micro-operations dependent on conditional micro-operations.

For block 902 of FIG. 9, dispatch/execute unit 206 dispatches for execution a micro-operation that depends on a conditional micro-operation. For one embodiment, the dependent micro-operation may depend on the conditional micro-operation from outside the branch instruction path for the conditional micro-operation. Dispatch/execute unit 206 dispatches the dependent micro-operation when it is ready to be executed regardless of whether a condition associated with the conditional micro-operation has been resolved. Dispatch/execute unit 206 for one embodiment identifies the dependent micro-operation as having a source operand based on the first and/or second results and the associated condition from the conditional micro-operation. Dispatch/execute unit 206 for one embodiment dispatches the dependent micro-operation to an appropriate execution unit based on the operation designated by the dependent micro-operation.

Dispatch/execute unit 206 executes the dependent micro-operation by performing the operation designated by the dependent micro-operation using the first result of the conditional micro-operation to produce a third result for block 904 and by performing the operation designated by the dependent micro-operation using the second result of the conditional micro-operation to produce a fourth result for block 906. Dispatch/execute unit 206 for one embodiment performs the operation designated by the dependent micro-operation on one or more source operands, including the first result for block 904 and the second result for block 906, for the dependent micro-operation to produce the third result and the fourth result, respectively.

Dispatch/execute unit 206 for block 908 associates the condition associated with the conditional micro-operation with both the third result and the fourth result and for block 910 outputs both the third result and the fourth result with the associated condition. Dispatch/execute unit 206 for one embodiment stores the third result, the fourth result, and a conditional flag identifying the associated condition in reorder buffer 204. The conditional flag is captured when written upon execution of a micro-operation modifying the conditional flag. In retiring the dependent micro-operation, retire unit 208 for one embodiment may then scan the status of the dependent micro-operation, determine whether the associated condition has been resolved by determining whether the conditional flag has been validated, and commit either the third result or the fourth result to machine state based on how the condition was resolved.

Retire unit 208 commits the third result to machine state if the associated condition was resolved such that the instruction from which the conditional micro-operation was decoded is to be executed. Retire unit 208 commits the fourth result to machine state if the associated condition was resolved such that the instruction from which the conditional micro-operation was decoded is not to be executed.

If the condition associated with the conditional micro-operation has already been resolved when dispatch/execute unit 206 dispatches the dependent micro-operation, dispatch/execute unit 206 for one embodiment executes the dependent micro-operation using the appropriate first or second result to output only the appropriate third or fourth result, respectively, in association with the resolved condition. Dispatch/execute unit 206 for another embodiment executes the dependent micro-operation to output both the third and fourth results in association with the resolved condition.

Dispatch/execute unit 206 for one embodiment may continue similarly executing micro-operations that depend on micro-operations dependent on conditional micro-operations regardless of whether the condition associated with the dependent micro-operation has been resolved.

As an illustration as to how dispatch/execute unit 206 executes micro-operations in accordance with flow diagrams 800 and 900, an exemplary program fragment contains the following instructions:

|          | JC (Target1) |
|          | ADD S1,S2    |
| Target1: | MUL S3,S1    | where JC (Target1) designates to jump or branch to the instruction at Target1 if condition C is satisfied or to continue with the next sequential instruction if condition C is not satisfied, ADD S1,S2 designates to add the content of logical register S1 to that of logical register S2 and store the sum in logical register S1, and MUL S3,S1 designates to multiply the content of logical register S3 by the content of logical register S1 and store the product in logical register S3. For this illustration, JC (Target1) is identified as a qualifying conditional branch instruction, and fetch/decode unit 202 decodes the instruction ADD S1,S2 into a single conditional micro-operation and decodes the instruction MUL S3,S1 into a single micro-operation.

Before the condition C is resolved, dispatch/execute unit 206 may dispatch and execute the conditional micro-operation for the instruction ADD S1,S2 in accordance with flow diagram 800 of FIG. 8 to produce the sum of the content of the logical registers S1 and S2 as a first result, to produce the content of the logical register S1 as a second result, and to associate the condition C with both the first and second results.

Although the instruction MUL S3,S1 is outside the fall through branch instruction path for the qualifying conditional branch instruction JC (Target1) and depends on the instruction ADD S1,S2, dispatch/execute unit 206 may also dispatch and execute, before the condition C is resolved, the micro-operation for the instruction MUL S3,S1 in accordance with flow diagram 900 of FIG. 9 to produce the product of the content of the logical register S3 and the first result as a third result, to produce the product of the content of the logical register S3 and the second result as a fourth result, and to associate the condition C with both the third and fourth results.

Retire unit 208 commits the first and third results to machine state if the condition C is resolved such that the instruction ADD S1,S2 is to follow the qualifying conditional branch instruction JC (Target1) and commits the second and fourth results to machine state if the condition C is resolved such that the instruction MUL S3,S1 is to follow the qualifying conditional branch instruction JC (Target1).

Dispatch/execute unit 206 may execute micro-operations in accordance with flow diagrams 800 and 900 using any suitable circuitry. Dispatch/execute unit 206 for one embodiment dispatches a conditional micro-operation to an execution unit comprising circuitry to perform the operation designated by the conditional micro-operation to produce a first result and circuitry to perform the execution bypass operation to produce a second result. The execution unit also comprises circuitry to output the first and/or second results. Dispatch/execute unit 206 may comprise any suitable circuitry to associate the condition for the conditional micro-operation with the first and/or second results.

Dispatch/execute unit 206 for one embodiment dispatches a micro-operation that depends on a conditional micro-operation to an execution unit comprising circuitry to perform the operation designated by the dependent micro-operation to produce a third and/or fourth result. The execution unit also comprises circuitry to output the third and/or fourth results. Dispatch/execute unit 206 may comprise any suitable circuitry to associate the condition for the conditional micro-operation with the third and/or fourth results.

Dispatch/execute unit 206 for one embodiment comprises suitable circuitry to execute a scalar micro-operation having an associated condition as a single instruction multiple data (SIMD) micro-operation to execute the scalar micro-operation for each possible condition.

Figure 10:
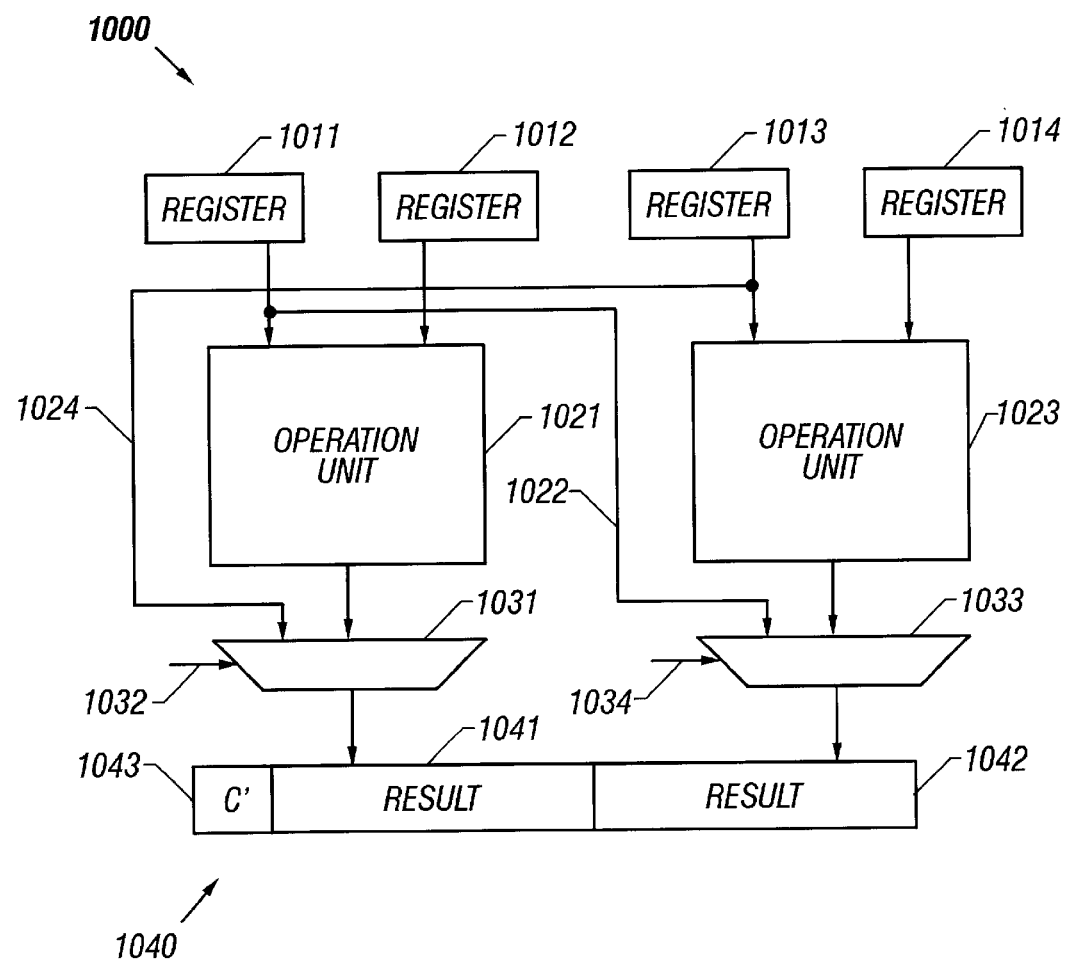
FIG. 10 illustrates, for one embodiment, dual execution circuitry with destination bypassing.

FIG. 10 illustrates, for one embodiment, dual execution circuitry 1000 with destination bypassing for an execution unit. Dual execution circuitry 1000 may be implemented in any suitable one or more execution units, such as an integer execution unit and/or a floating point execution unit for example. Dual execution circuitry 1000 for one embodiment is implemented in one or more suitable SIMD execution units.

Dual execution circuitry 1000 comprises a register 1011 to store a source operand in a dispatched micro-operation and a register 1012 to store a source operand in the dispatched micro-operation. The output of each register 1011 and 1012 is coupled to a respective input of an operation unit 1021 for performing the operation designated by the dispatched micro-operation. Operation unit 1021 may comprise any suitable circuitry to perform any suitable operation designated by a micro-operation. Operation unit 1021 may comprise, for example, an integer arithmetic logic unit (ALU). The output of operation unit 1021 is coupled to an input of a multiplexer 1031 and presents a result to multiplexer 1031. The output of register 1011 is also coupled to an input of a multiplexer 1033 by an execution bypass bus 1022 and presents a result to multiplexer 1033.

Dual execution circuitry 1000 also comprises a register 1013 to store a source operand in a dispatched micro-operation and a register 1014 to store a source operand in the dispatched micro-operation. The output of each register 1013 and 1014 is coupled to a respective input of an operation unit 1023 for performing the operation designated by the dispatched micro-operation. Operation unit 1023 may comprise any suitable circuitry to perform any suitable operation designated by a micro-operation. Operation unit 1023 may comprise, for example, an integer arithmetic logic unit (ALU). The output of operation unit 1023 is coupled to an input of multiplexer 1033 and presents a result to multiplexer 1033. The output of register 1013 is also coupled to an input of multiplexer 1031 by an execution bypass bus 1024 and presents a result to multiplexer 1031.

Multiplexer 1031 selectively outputs either the result from operation unit 1021 or the result from destination bypass bus 1024 to a field 1041 of a result register 1040 based on a first dual execution control signal 1032. Multiplexer 1033 selectively outputs either the result from operation unit 1023 or the result from destination bypass bus 1022 to a field 1042 of result register 1040 based on a dual execution control signal 1034. An execution unit comprising dual execution circuitry 1000, for one embodiment, generates dual execution control signals 1032 and 1034 in accordance with the dispatched micro-operation. An execution unit comprising dual execution circuitry 1000, for one embodiment, derives an appropriate condition from the dispatched micro-operation and stores suitable information identifying the appropriate condition in a field 1043 of result register 1040.

To execute a conditional micro-operation for one embodiment, operation unit 1023 performs the operation designated by the conditional micro-operation using a source operand stored in register 1013 and any source operand stored in register 1014 and outputs a first result to multiplexer 1033. The source operand stored in register 1013 is also presented to multiplexer 1031 by destination bypass bus 1024 as a second result. Multiplexers 1031 and 1033may then be controlled through first and second dual execution control signals 1032 and 1034, respectively, to output the second and first results, respectively, to fields 1041 and 1042, respectively, of result register 1040. An appropriate condition is derived, for example, from the condition associated with the conditional micro-operation and stored in field 1043 of result register 1040.

To execute a conditional micro-operation for another embodiment, operation unit 1021 performs the operation designated by the conditional micro-operation using a source operand stored in register 1011 and any source operand stored in register 1012 and outputs a first result to multiplexer 1031. The source operand stored in register 1011 is also presented to multiplexer 1033 by destination bypass bus 1022 as a second result. Multiplexers 1031 and 1033 may then be controlled through first and second dual execution control signals 1032 and 1034, respectively, to output the first and second results, respectively, to fields 1041 and 1042, respectively, of result register 1040. An appropriate condition is derived, for example, from the condition associated with the conditional micro-operation and stored in field 1043 of result register 1040.

If the condition for the conditional micro-operation has already been resolved, an execution unit comprising dual execution circuitry 1000 may alternatively output only one result based on the resolved condition to field 1041 or 1042.

To execute, for one embodiment, a micro-operation that depends on a conditional micro-operation, operation unit 1021 performs the operation designated by the dependent micro-operation using the first result from the conditional micro-operation and any other source operand in the dependent micro-operation and outputs a third result to multiplexer 1031. The first result may be stored in either register 1011 or register 1012, and any other source operand may be stored in the other register 1011 or 1012. Operation unit 1023 performs the operation designated by the dependent micro-operation using the second result from the conditional micro-operation and any other source operand in the dependent micro-operation and outputs a fourth result to multiplexer 1033. The second result may be stored in either register 1013 or register 1014, and any other source operand may be stored in the other register 1013 or 1014. Multiplexers 1031 and 1033 may then be controlled through first and second dual execution control signals 1032 and 1034, respectively, to output the third and fourth results, respectively, to fields 1041 and 1042, respectively, of result register 1040. An appropriate condition is derived from the condition associated with the first and/or second results of the conditional micro operation and stored in field 1043 of result register 1040.

To execute, for another embodiment, a micro-operation that depends on a conditional micro-operation, operation unit 1021 performs the operation designated by the dependent micro-operation using the second result from the conditional micro-operation and any other source operand in the dependent micro-operation and outputs a fourth result to multiplexer 1031. The second result may be stored in either register 1011 or register 1012, and any other source operand may be stored in the other register 1011 or 1012. Operation unit 1023 performs the operation designated by the dependent micro-operation using the first result from the conditional micro-operation and any other source operand in the dependent micro-operation and outputs a third result to multiplexer 1033. The first result may be stored in either register 1013 or register. 1014, and any other source operand may be stored in the other register 1013 or 1014. Multiplexers 1031 and 1033 may then be controlled through first and second dual execution control signals 1032 and 1034, respectively, to output the fourth and third results, respectively, to fields 1041 and 1042, respectively, of result register 1040. An appropriate condition is derived from the condition associated with the first and/or second results of the conditional micro-operation and stored in field 1043 of result register 1040.

An execution unit comprising dual execution circuitry 1000 may execute a micro-operation dependent on another micro-operation that depends on a conditional micro-operation similarly as a micro-operation that depends on a conditional micro-operation, only using the third and fourth results of the other dependent micro-operation. An appropriate condition is derived from the condition associated with the third and/or fourth results of the other dependent micro-operation and stored in field 1043 of result register 1040.

If the condition for the dependent micro-operation has already been resolved, an execution unit comprising dual execution circuitry 1000 may alternatively execute the dependent micro-operation to output only one result based on the resolved condition to field 1041 or 1042. An execution unit comprising dual execution circuitry 1000 may use the appropriate first or second result from a-conditional micro-operation based on the resolved condition in executing a micro-operation dependent on the conditional micro-operation. An execution unit comprising dual execution circuitry 1000 may use the appropriate third or fourth result from a micro-operation dependent on a conditional micro-operation based on the resolved condition in executing a micro-operation dependent on that dependent micro-operation.

For one embodiment, dual execution circuitry 1000 may also be used in normally executing micro-operations designating a suitable operation that may be performed by operation unit 1021 and/or operation unit 1023.

An execution unit comprising dual execution circuitry 1000, for one embodiment, outputs the third and/or fourth results with the associated condition from result register 1040 for storage in reorder buffer 204.

Optimization

Instruction pipeline 200 for one embodiment identifies qualifying conditional branch instructions as those identifying a target instruction within a suitable predetermined number of instructions from the conditional branch instruction. In this manner, instruction pipeline 200 helps reduce any additional overhead associated with processing instructions in a fall through branch instruction path that is not taken. Instruction pipeline 200 for one embodiment may also identify qualifying conditional branch instructions as those having a target branch instruction path having less than or equal to a suitable predetermined number of instructions.

Limiting the number of instructions in either or both branch instruction paths for a qualifying conditional branch instruction also helps minimize the number of control instructions, such as backward branches for example, that may be in a non-taken branch instruction path. Such control instructions may unnecessarily add to overhead by fetching additional unnecessary instructions for a branch instruction path that is not taken.

Limiting the number of instructions in either or both branch instruction paths for a qualifying conditional branch instruction also helps minimize the number of instructions that are outside the branch instruction path and that have source dependency on instructions in the branch instruction path. Such dependent instructions may be delayed from execution until resolution of a condition for the qualifying conditional branch instruction.

Instruction pipeline 200 for one embodiment identifies qualifying conditional branch instructions as those not being predictable within a suitable predetermined degree of accuracy to help reduce any overhead associated with processing instructions in a branch instruction path that is not likely to be taken. Unlike using software predication where compiler decisions are static, instruction pipeline 200 may then dynamically determine whether to perform predication or accept a branch prediction upon fetching any conditional branch instruction.

The predictability of a conditional branch instruction may be determined in any suitable manner. For one embodiment, instruction pipeline 200 determines how often a condition for the conditional branch instruction is resolved in the same manner each time the conditional branch instruction is executed. If the condition is resolved in the same manner for greater than or equal to a suitable predetermined percentage of the number of times the conditional branch instruction has already been executed, the conditional branch instruction is considered predictable within a suitable predetermined degree of accuracy.

If a control instruction occurred in a branch instruction path for a qualifying conditional branch instruction, instruction pipeline 200 for one embodiment fetches the control instruction yet delays processing the control instruction any further until a condition for the qualifying conditional branch instruction is resolved. In this manner, instruction pipeline 200 helps reduce any additional overhead in processing instructions in additional instruction paths.

If instruction pipeline 200 identifies a qualifying conditional branch instruction in a branch instruction path for another qualifying conditional branch instruction, instruction pipeline 200 for one embodiment may predict fall through execution for the nested qualifying conditional branch instruction and associate two conditions with each micro-operation decoded from an instruction in each nested branch instruction path. That is, the condition associated with each qualifying conditional branch instruction is associated with each such micro-operation. Dispatch/execute unit 206 may then dispatch and execute each such micro-operation in a suitable manner, accounting for each condition associated with the micro-operation.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
    executing an identified conditional instruction having an associated first instruction path and a second instruction path, the executing comprising:
    (i) performing both a first operation from the first instruction path to produce a first result and a second operation from the second instruction path to produce a second result, and
    (ii) outputting the first result or the second result based on how a condition associated with the conditional instruction is resolved.

2. The method of claim 1, wherein the performing comprises performing the first operation using at least one operand for the instruction to produce the first result and performing the second operation to produce an operand for the instruction as the second result.

3. The method of claim 1, wherein the instruction is a conditional micro-operation and wherein the method comprises decoding a macro-instruction in a branch instruction path of a program to produce the conditional micro-operation.

4. The method of claim 1, wherein prior to executing the identified conditional instruction, the method comprises:
    (a) identifying a conditional branch instruction in a program as the identified conditional instruction;
    (b) associating a condition for the identified conditional branch instruction with one or more instructions in a first branch instruction path and a second branch instruction path for the conditional branch instruction to produce one or more conditional instructions.

5. The method of claim 4, wherein the identifying comprises identifying a conditional forward branch instruction as the identified conditional instruction.

6. The method of claim 4, wherein the identifying comprises identifying a conditional branch instruction having a fall through branch instruction path having less than or equal to a predetermined number of instructions and/or a conditional branch instruction having a target branch instruction path having less than or equal to a predetermined number of instructions.

7. The method of claim 4, wherein the identifying comprises identifying a conditional branch instruction that is not predictable within a predetermined degree of accuracy.

8. The method of claim 4, wherein each conditional instruction is a conditional micro-operation and wherein the method comprises decoding one or more macro-instructions in the branch instruction path to produce one or more conditional micro-operations.

9. A processor comprising:
    an operation unit to perform an operation designated by a conditional instruction on one or more operands for the conditional instruction to produce a first result;
    a bypass bus coupled to an input of the operation unit to receive an operand for the conditional instruction and to present the operand as a second result; and
    a multiplexer to selectively output either the first result or the second result based on how a condition associated with the conditional instruction is resolved.

10. The processor of claim 9, comprising a conditional branch processing unit to associate a condition for a conditional branch instruction with one or more instructions in one or more branch instruction paths for the conditional branch instruction to produce one or more conditional instructions.

11. The processor of claim 9, wherein the conditional instruction is a conditional micro-operation, and wherein the processor comprises a decoder to decode macro-instructions of a program into micro-operations.

12. A processor comprising:
(a) a dispatch/execute unit to dispatch and execute instructions for a program out of order, the dispatch/execute unit comprising an execution unit to perform both a first operation from a first instruction path associated with a conditional instruction to produce a first result and a second operation from a second instruction path associated with the conditional instruction to produce a second result and to output the first result or the second result based on how a condition associated with the conditional instruction is resolved;
(b) a reorder buffer to store results of executed instructions; and
(c) a retire unit to retire results of executed instructions.

13. The processor of claim 12, comprising a conditional branch processing unit to associate a condition for a conditional branch instruction with one or more instructions in one or more branch instruction paths for the conditional branch instruction to produce one or more conditional instructions.

14. The processor of claim 12, comprising a fetch/decode unit to fetch macro-instructions of the program and to decode the fetched macro-instructions into micro-operations, wherein the dispatch/execute unit dispatches and executes micro-operations.

15. The processor of claim 12, wherein the execution unit comprises:
(i) an operation unit to perform the operation designated by the conditional instruction on one or more operands for the conditional instruction to produce the first result,
(ii) a bypass bus coupled to an input of the operation unit to receive an operand for the conditional instruction and to present the operand as a second result, and
(iii) a multiplexer to selectively output either the first result or the second result based on how the condition associated with the conditional instruction is resolved.

16. A computer system comprising:
(a) a memory to store instructions of a program; and
(b) a processor to perform both a first operation from a first instruction path associated with a conditional instruction to produce a first result and a second operation from a second instruction path associated with the conditional instruction to produce a second result and to output the first result or the second result based on how a condition associated with the conditional instruction is resolved.

17. The computer system of claim 16, wherein the processor comprises:
(i) a dispatch/execute unit to dispatch and execute instructions for the program out of order, the dispatch/execute unit comprising an execution unit to perform the first operation and the second operation and to output the first result or the second result,
(ii) a reorder buffer to store results of executed instructions, and
(iii) a retire unit to retire results of executed instructions.

18. The computer system of claim 16, wherein the processor comprises a conditional branch processing unit to associate a condition for a conditional branch instruction with one or more instructions in one or more branch instruction paths for the conditional branch instruction to produce one or more conditional instructions.

19. The computer system of claim 16, wherein the processor comprises a fetch/decode unit to fetch macro-instructions of the program and to decode the fetched macro-instructions into micro-operations.

20. The computer system of claim 16, wherein the processor comprises:
(i) an operation unit to perform the operation designated by the conditional instruction on one or more operands for the conditional instruction to produce the first result,
(ii) a bypass bus coupled to an input of the operation unit to receive an operand for the conditional instruction and present the operand as a second result, and
(iii) a multiplexer to selectively output either the first result or the second result based on how the condition associated with the conditional instruction is resolved.

21. The computer system of claim 16, comprising:
a memory controller hub to provide an interface to the memory; and
an input/output controller hub coupled to the memory controller hub.

* * * * *